United States Patent

[11] 3,567,134

| | | |
|---|---|---|
| [72] | Inventor | Moyer W. Smith<br>Wooster, Ohio |
| [21] | Appl. No. | 856,356 |
| [22] | Filed | Sept. 9, 1969 |
| [45] | Patented | Mar. 2, 1971 |
| [73] | Assignee | Rubbermaid Incorporated<br>Wooster, Ohio |

[54] DUAL PURPOSE HOSE
6 Claims, 6 Drawing Figs.

[52] U.S. Cl. .................................................. 239/547,
239/447, 239/450, 138/115, 138/118
[51] Int. Cl. ...................................................... B05b 15/00
[50] Field of Search ............................................ 239/547,
447; 138/111, 115, 118; 239/450

[56] References Cited
UNITED STATES PATENTS

| 2,730,404 | 1/1956 | Meisinger et al. | 239/450X |
| 2,743,960 | 5/1956 | Kamin | 239/447 |
| 2,753,215 | 7/1956 | Barr | 239/447 |
| 2,908,949 | 10/1959 | Frehse | 138/111X |
| 3,004,330 | 10/1961 | Wilkins | 138/115X |
| 3,080,124 | 3/1963 | Rathmann | 239/450 |

FOREIGN PATENTS

| 1,129,788 | 1/1957 | France | 138/115 |

*Primary Examiner*—M. Henson Wood, Jr.
*Assistant Examiner*—Edwin D. Grant
*Attorney*—Hamilton, Cook, Renner & Kenner ABSTRACT: A flexible hose for selectively delivering fluid in different conditions, as for example, a stream of water for sprinkling or a multiplicity of fine jets or sprays for gradually soaking the soil. The hose has a flexible main partition wall with lateral partition walls extending therefrom to an adjacent perforate part of the outer hose wall. The main and lateral partition walls assume a substantially semicylindrical shape in conformance with the perforate part of the outer hose which is normally cylindrical when fluid is conducted along the opposite side of the main partition wall, and the main partition wall assumes a substantially flat shape and draws another part of the outer hose wall into substantial conformance therewith when fluid is conducted along the near side of the main partition wall, with the lateral partition walls forming separate compartments along said near side.

INVENTOR.
MOYER W. SMITH
BY Hamilton, Cook,
Renner + Kenner
ATTORNEYS

PATENTED MAR 2 1971 3,567,134

INVENTOR.
MOYER W. SMITH
BY Hamilton, Cook,
Renner & Kenner
ATTORNEYS 3,567,134

DUAL PURPOSE HOSE

BACKGROUND OF THE INVENTION

Conventional garden hoses normally comprise two types: (1) a cylindrical hose for sprinkling a stream of water, and (2) a hose having a flattened shape with perforations on one side for discharging a multiplicity of fine sprays. Prior attempts to combine the two functions into one hose have been made, for example, in the construction disclosed in U.S. Pat. No. 2,743,960, which comprises a substantially cylindrical hose having a central partition wall extending diametrically across and dividing the hose into two compartments, one for sprinkling and one for spraying.

One disadvantage with this latter construction is that when spraying, the hose does not lie flat and it is difficult to direct and maintain the sprays in the desired directions. Another difficulty is that when either sprinkling or spraying only half of the volume of the hose is utilized, and this is a serious drawback when sprinkling as it greatly restricts the volume of water discharged for a given size of hose. Thus, for obtaining the full volume of water equivalent to that normally discharged from a standard size hose, a hose having a much larger diameter would be required, making the cost of the hose excessive.

SUMMARY OF THE INVENTION

It is an object of the present invention to provide an improved dual purpose hose which overcomes the disadvantages of prior constructions and provides a relatively simple and economical construction.

Another object is to provide an improved dual purpose hose utilizing substantially the full volume of the hose for discharging fluid in two different states or conditions.

A further and more specific object is to provide an improved dual purpose hose for selectively discharging water in a multiplicity of fine sprays throughout its length or discharging a stream from one end utilizing the full volume of the hose.

Still another object is to provide an improved dual purpose hose which assumes a substantially flat shape when collapsed and not in use such that is can be rolled into a minimum amount of space for storage purposes.

These and other objects are accomplished by the improved construction comprising the present invention, a preferred embodiment of which is shown in the accompanying drawings and described in detail herein, the scope of the invention being measured by the appended claims.

DESCRIPTION OF A PREFERRED EMBODIMENT

Figure 1:
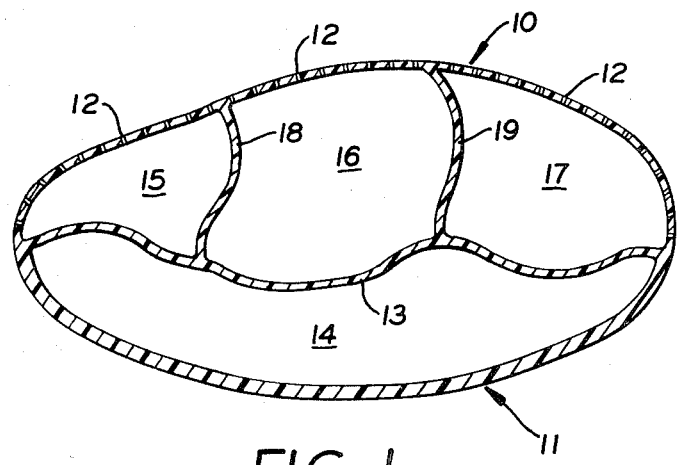
FIG. 1 is a cross-sectional view of the improved dual purpose hose in partially collapsed condition.

For the sake of clarity, the hose shown in the drawings has a single ply casing, but it will be understood that it may be a multi-ply casing with a protective outer wrap or ply, in accordance with conventional hose constructions. Also the hose may be made of flexible rubber or plastic material, or a combination of both, and suitably reinforced, if desired.

Referring first to FIG. 1 showing the hose in partly collapsed condition, the outer casing comprises two parts connected to each other to form a tube, a perforate wall portion 10 connected at its ends to an imperforate wall portion 11. The perforations 12 in portion 10 are preferably very small in diameter and are adapted, when water under pressure is conducted through the hose in communication with said perforate wall, to discharge the water in a multiplicity of very fine jets several feet in length, for the purpose of gradually soaking the soil in accordance with conventional and well-known practice normally employing a substantially flat hose sometimes called a "soaker" or "sprayer" having such perforations on one side.

Obviously, the hose may be used for other purposes, and the wall portion 10 may be partly or entirely imperforate.

A main partition wall 13 of flexible material, which may be the same or similar to the material of the outer casing is connected at its ends to the outer casing preferably at or adjacent to the junctures of the perforate and imperforate portions, so as to divide the hose into two compartments. The compartment 14 is between the main partition wall 13 and the imperforate part 11 of the outer casing. The compartment between partition wall 13 and the perforate casing portion 10 is preferably divided into three compartments 15, 16 and 17 by two partition walls 18 and 19 extending laterally from main partition wall 13 and connected at their outer ends to the perforate casing portion 10. These lateral partition walls 18 and 19 may be formed from the same or similar flexible material as the other walls. Obviously, the number of lateral partition walls may be varied, as desired.

The hose may be formed by any conventional method, such as extruding the outer casing and partition walls as an integral tube, and then piercing the portion 10 of the casing with the multiplicity of tiny apertures, as required.

Figure 2:
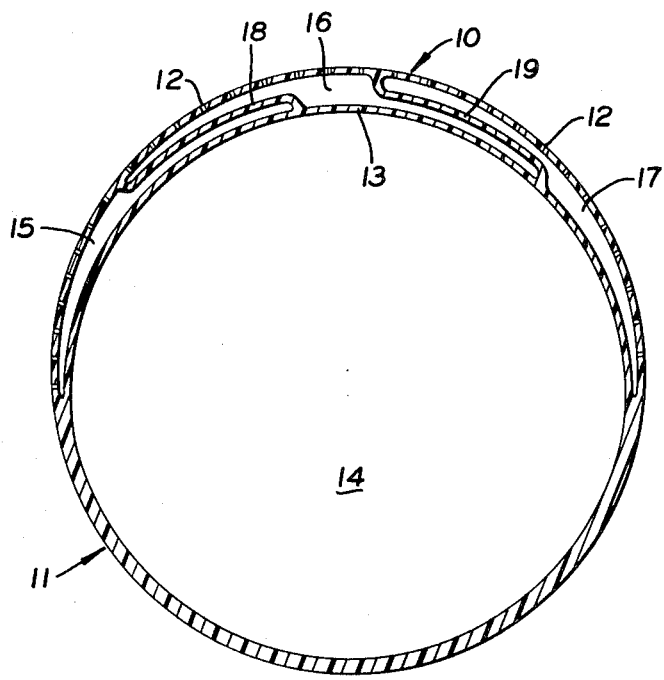
FIG. 2 is a similar view thereof when used as for discharging a stream with the main partition wall expanded into substantially semicircular shape and the lateral partition walls and the perforate part of the outer hose wall folded closely around the main partition wall.

In operation, if water or other fluid under pressure is conducted through the hose in compartment 14, the pressure of the water will stretch and expand the main partition wall 13 into a substantially semicylindrical shape, as shown in FIG. 2, thereby causing the lateral partition walls 18 and 19 to fold down alongside the main partition wall 13 and the outer perforate casing portion 10 to assume a substantially semicylindrical shape outwardly of and adjacent to said main partition wall 13.

The imperforate casing portion 11 is expanded into semicylindrical shape in the opposite direction so that the compartment 14 becomes substantially circular in cross section, utilizing the full volume of the hose to an extent substantially the same as if there were no partition walls therein.

Obviously, the main partition wall 13 and the lateral partition walls 18 and 19 should be of such thickness and flexibility as to substantially assume the shapes indicated in FIG. 2 when water under normal pressure is conducted through the compartment 14. In the case of using city water the normal pressure may be of the order of 30 psi to 100 psi.

Figure 3:
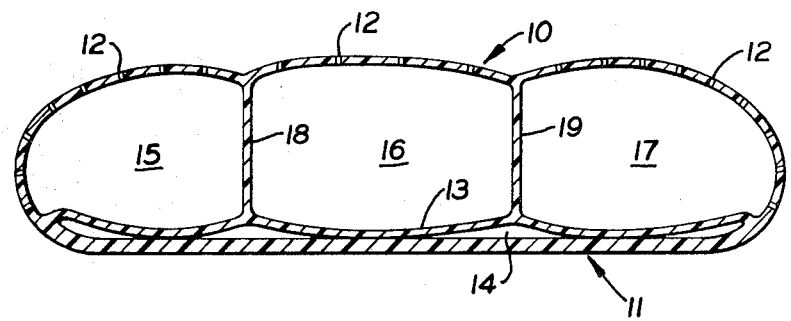
FIG. 3 is a similar view thereof when used for discharging a multiplicity of jet sprays from the perforate part of the outer wall, showing the main partition wall in substantially flat shape with the lateral partition walls extending straight out from one side to the perforate part of the outer wall and the nonperforate part of the outer wall drawn up against the opposite side of the main partition wall.

When water under such pressure is conducted through the hose on the other side of main partition wall 13, that is, the side adjacent to perforate casing portion 10, it flows through compartments 15, 16 and 17, and the pressure of the water will cause the compartments to expand and assume shapes substantially as shown in FIG. 3, with the main partition wall 13 assuming a substantially flattened shape, and the imperforate casing portion 11 drawn into substantially flat shape adjacent to the main partition wall. In order to facilitate maintaining the casing portion 11 in substantially flat shape under these conditions, it is preferably made with a wall somewhat thicker than the other walls, although this could be accomplished by using a somewhat less flexible material in the casing portion 11.

Accordingly, when water under pressure is flowing through compartments 15, 16 and 17 on the side of main partition wall adjacent or near to the perforate casing portion 10, the hose will lie flat on the ground with the multiplicity of fine jets discharging upwardly and outwardly, as desired. Here again, the full volume of the hose is utilized to conduct water therethrough.

Figure 4:
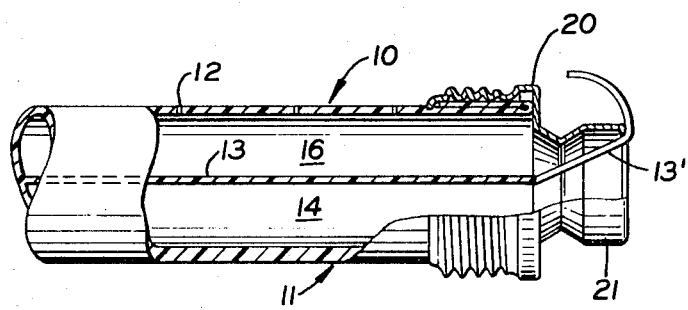
FIG. 4 is an elevation of the entrance end of the hose attached to one part of a snap-on coupling, partly broken away, showing the main partition wall extended into the coupling to act as a flow selector and in position to direct flow along one side of the partition wall.
Figure 5:
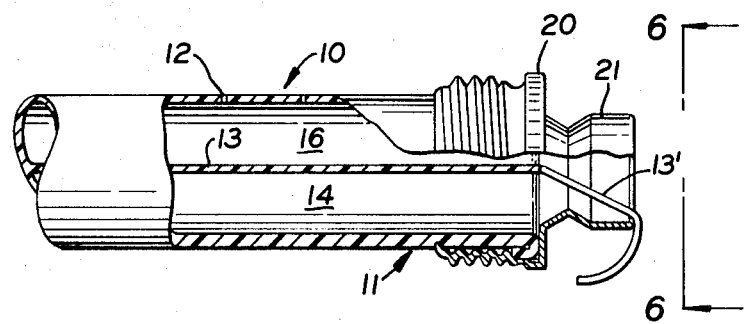
FIG. 5 is a similar view showing the main partition wall in position to direct flow along the opposite side of the partition wall.
Figure 6:
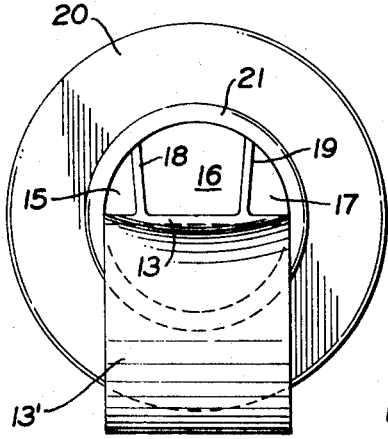
FIG. 6 is an end elevational view on line 6—6 of FIG. 5.

Although the water from a supply source may be conducted selectively along one side or the other of the main partition wall by a variety of valving means, a suitable embodiment is shown by way of example in FIGS. 4—6. The male part of a conventional snap-on coupling is shown at 20 connected to one end of the hose. The female part (not shown) is adapted to snap over part 20 and is connected to a water supply. The main partition wall 13 is extended at 13' out through the neck 21 of coupling part 20 so as to be frictionally held against the rim by the female coupling part when snapped over the neck.

When the partition wall extension 13' is held against the upper part of the neck 21, as shown in FIG. 4. water from the water supply will flow through compartment 14 and the hose will assume the shape of FIG. 2 for discharging a cylindrical stream of water. When the partition wall extension 13' is held against the lower part of the neck 21, as shown in FIGS. 5 and 6, water from the supply will flow through the compartments 15, 16 and 17 and the hose will assume the shape of FIG. 3.

When the hose is not in use it is easily collapsed into a substantially flat shape which is easily folded or coiled for storage.

The improved hose construction provides a dual purpose hose which is simple and inexpensive to make and use and utilizes substantially the full volume of the hose for discharging a single stream or a multiplicity of jets, thus overcoming the disadvantages of known prior constructions.

I claim:

1. A hose for delivering fluid selectively in different conditions comprising a flexible outer wall adapted to assume a substantially cylindrical shape under internal pressure, a main flexible partition wall extending across said hose and having lateral partition walls extending from one side thereof and connected to the outer hose wall, said main and lateral partition walls being constructed and arranged to substantially conform to the cylindrical shape of the contiguous part of the outer wall when fluid under pressure is conducted along the side of the main partition wall opposite to the lateral partition walls, and said main partition wall being constructed and arranged to assume a substantially flat shape with the lateral partition walls forming separate compartments with said contiguous part of the outer hose wall and the remaining outer wall substantially conforming to the flat opposite side of said main partition wall when fluid under pressure is conducted along said one side thereof.

2. A hose as defined in claim 1, in which said contiguous part of the outer wall is perforated.

3. A hose as defined in claim 2, in which said main partition wall connects with the ends of said contiguous outer wall part.

4. A hose as defined in claim 1, in which valve means are provided at the entrance end of the hose for selectively conducting fluid on opposite sides of said main partition wall.

5. A hose as defined in claim 2, in which valve means are provided at the entrance end of the hose for selectively conducting fluid on opposite sides of said main partition wall.

6. A hose as defined in claim 4 in which the valve means comprises means for selectively clamping an extension of the main partition wall over opposite sides of an entrance port for conducting fluid through the hose selectively on opposite sides of said main partition wall.